(12) United States Patent
Cho et al.

(10) Patent No.: US 10,877,305 B2
(45) Date of Patent: Dec. 29, 2020

(54) DISPLAY APPARATUS

(71) Applicant: SAMSUNG ELECTRONICS CO., LTD., Suwon-si (KR)

(72) Inventors: Jin Hyun Cho, Suwon-si (KR); Nam Seok Roh, Suwon-si (KR); Won Geun Ryu, Suwon-si (KR); Sang Hyun Sohn, Suwon-si (KR); Hyo Gun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/534,470

(22) Filed: Aug. 7, 2019

(65) Prior Publication Data

US 2020/0064664 A1 Feb. 27, 2020

(30) Foreign Application Priority Data

Aug. 27, 2018 (KR) .................. 10-2018-0100153

(51) Int. Cl.
*G02F 1/1334* (2006.01)
*G02F 1/1335* (2006.01)
(Continued)

(52) U.S. Cl.
CPC ........ *G02F 1/1334* (2013.01); *G02F 1/13439* (2013.01); *G02F 1/133524* (2013.01);
(Continued)

(58) Field of Classification Search
CPC ................ G02F 1/1334; G02F 1/1335; G02F 1/133528; G02F 1/133536; G02F 1/133615; G02F 1/137; G02F 1/1326; G02F 1/133504; G02F 1/13476; G02F 1/133611; G02F 1/133524; G02F 1/133553; G02F 1/1336; G02F 1/133606; G02F 1/1343; G02F 1/13439; G02F 2001/13756;
(Continued)

(56) References Cited

U.S. PATENT DOCUMENTS 5,769,393 A * 6/1998 Kobayashi ........... C09K 19/544
252/299.01
6,271,899 B1 * 8/2001 Lewis .................... G02F 1/1334
349/198

(Continued)

FOREIGN PATENT DOCUMENTS

KR 10-2011-0138585 A 12/2011
KR 10-2013-0008442 A 1/2013
(Continued)

OTHER PUBLICATIONS

International Search Report (PCT/ISA/210), issued by International Searching Authority in corresponding International Application No. PCT/KR2019/007843, dated Oct. 25, 2019.

*Primary Examiner* — Thoi V Duong
(74) *Attorney, Agent, or Firm* — Sughrue Mion, PLLC (57) ABSTRACT

Provided is a display apparatus including a light source configured to emit light; a light guide plate configured to diffuse and emit light emitted from the light source; and a local dimming portion configured to pass or scatter light emitted from the light guide plate. The local dimming portion may include an electro-optical material and a plurality of grains having refractive index that changes based on an electric field.

15 Claims, 9 Drawing Sheets

(51) Int. Cl.
*G02F 1/1343* (2006.01)
*G02F 1/1347* (2006.01)

(52) U.S. Cl.
CPC .... *G02F 1/133553* (2013.01); *G02F 1/13476* (2013.01); *G02F 2203/01* (2013.01); *G02F 2203/03* (2013.01)

(58) Field of Classification Search
CPC ..... G02F 2001/133601; G02F 2203/01; G02F 2203/03; G02B 6/0041; G02B 6/0001
See application file for complete search history.

(56) References Cited

U.S. PATENT DOCUMENTS

2012/0293566 A1\* 11/2012 Uchida ................ G09G 3/3611
345/690
2016/0349430 A1    12/2016 Li et al.

FOREIGN PATENT DOCUMENTS

| KR | 10-1477425 B1 | 12/2014 |
| WO | 2017172689 A1 | 10/2017 |

\* cited by examiner

DISPLAY APPARATUS

CROSS-REFERENCE TO RELATED APPLICATION

This application is based on and claims priority under 35 U.S.C. § 119 to Korean Patent Application No. 10-2018-0100153, filed on Aug. 27, 2018 in the Korean Intellectual Property Office, the disclosure of which is incorporated by reference in its entirety.

BACKGROUND

1. Field

Apparatuses consistent with exemplary embodiments of the disclosure relate to a display apparatus, and more particularly, to a display apparatus including an edge-type backlight unit.

2. Description of the Related Art

In the related art, display apparatuses refer to output apparatuses displaying visual information converted from received or stored image information to users and have been widely used in various application fields, such as individual homes or places of business.

For example, the display apparatuses may be monitor devices connected to personal computers or server computers, portable computer devices, navigation devices, televisions (TVs), Internet Protocol televisions (IPTVs), smart phones, tablet personal computers (PCs), personal digital assistants (PDAs), or portable terminals, such as cellular phones. In addition, the display apparatuses may be various display apparatuses used to play advertisements or movies, or various types of audio/video systems in the industrial field.

A display panel may include a thin film transistor (TFT) provided in each pixel. A plurality of pixels may be arranged in a matrix form, and the amount of light passing through the pixels may change or the amount of light emitted from the pixels may change depending on an image signal applied to the TFT. The display apparatus may display an image by adjusting the amount of light emitted from each of the pixels of the display panel.

The display panel for displaying an image may include a self-emissive display panel for emitting light by itself according to an image, and a non-emissive display panel for blocking or passing light emitted from a separate light source according to an image.

The non-emissive display panel is typically a liquid crystal display panel (LCD panel). The LCD panel may include a backlight unit for emitting light and a liquid crystal panel for blocking or passing light emitted from the backlight unit.

The backlight unit may be classified into a direct-type backlight unit and an edge-type backlight unit according to the position of a light source.

The edge-type backlight unit may include a light guide plate for diffusing light and a light source for emitting light. Light may be incident on the light guide plate from the light source located on a lateral surface of the light guide plate. The light incident on the light guide plate may move from the lateral surface to the center of the light guide plate through total reflection within the light guide plate and a uniform surface light may be emitted throughout the light guide plate by a pattern on the front or rear surface of the light guide plate.

The edge-type backlight unit may generally realize a backlight having a uniform brightness with a thin thickness, and may implement the backlight using a smaller number of light sources than the direct-type backlight unit.

On the other hand, in realizing local dimming in which the brightness varies depending on the position, the edge-type backlight unit has a narrow region in which local dimming may be realized, and may have difficulty in precisely controlling the local dimming.

SUMMARY

Provided is a display apparatus capable of performing local dimming to improve a contrast ratio of an image.

Additional aspects of the disclosure will be set forth in part in the description which follows and, in part, will be obvious from the description, or may be learned by practice of the disclosure.

In accordance with an aspect of the disclosure, there is provided a display apparatus including: a light source configured to emit light; a light guide plate configured to diffuse and emit light emitted from the light source; and a local dimming portion configured to pass or scatter light emitted from the light guide plate. The local dimming portion includes an electro-optical material and a plurality of grains having refractive index that changes based on an electric field.

The display apparatus may include the local dimming portion including: an electro-optic layer, optical characteristics of the electro-optic layer changing based on the electric field; and an electrode configured to generate the electric field in the electro-optic layer.

The display apparatus may include the light guide plate configured to have a first surface and a second surface; and diffuse light emitted from the light source and emit the light through the first surface. The local dimming portion is configured to pass or scatter light emitted through the second surface of the light guide plate.

The display apparatus may include the electro-optical material configured to change the refractive index based on at least one of a presence of the electric field, an intensity of the electric field, and a direction of the electric field.

The display apparatus may include the electro-optical material configured to have two different refractive indices based on at least one of the presence of the electric field, the intensity of the electric field, and the direction of the electric field.

The display apparatus may include the plurality of grains configured to have the same refractive index as any one of a plurality of refractive indices of the electro-optical material.

The display apparatus may include the light guide plate configured to have the same refractive index as the plurality of grains.

The display apparatus may include the light scattered by the local dimming portion configured to be emitted through the first surface of the light guide plate.

The display apparatus may include the electrode configured to reflect light that has passed through the electro-optic layer.

The display apparatus may include the electro-optical material including a polymer dispersed liquid crystal (PDLC).

The display apparatus may include a plurality of particles of the electro-optical material configured to have a size smaller than a wavelength of light.

The display apparatus may include a plurality of particles of the electro-optical material configured to have a radius smaller than ¼ of a wavelength of light.

In accordance with another aspect of the disclosure, there is provided a display apparatus including: a light guide plate; and a local dimming portion provided on one surface of the light guide plate, and configured to pass or scatter light emitted from the light guide plate through the one surface. The local dimming portion includes an electro-optical material and a plurality of grains having refractive index that changes based on an electric field.

The display apparatus may include the local dimming portion including: an electro-optic layer, optical characteristics of the electro-optic layer changing based on the electric field; and an electrode configured to generate the electric field in the electro-optic layer.

The display apparatus may include the electro-optical material configured to change the refractive index based on at least one of a presence of the electric field, an intensity of the electric field, and a direction of the electric field.

The display apparatus may include the electro-optical material configured to have two different refractive indices based on at least one of a presence of the electric field, an intensity of the electric field, and a direction of the electric field.

The display apparatus may include the plurality of grains configured to have the same refractive index as any one of a plurality of refractive indices of the electro-optical material.

The display apparatus may include the light guide plate configured to have the same refractive index as the plurality of grains.

The display apparatus may include the electrode configured to reflect light that has passed through the electro-optic layer.

The display apparatus may include a plurality of particles of the electro-optical material configured to have a size smaller than a wavelength of light.

BRIEF DESCRIPTION OF THE DRAWINGS

The above and/or other aspects of the disclosure will be more apparent and more readily appreciated from the following description of embodiments taken in conjunction with the accompanying drawings of which.

DETAILED DESCRIPTION

Reference will now be made in detail to the embodiments with reference to the accompanying drawings. The terms used herein are used to describe the embodiments and are not intended to limit and/or restrict the present disclosure. The terms "unit," "module," "member," or "block" used herein may be implemented using a software or hardware component. According to an embodiment, a plurality of "units," "modules," "members," or "blocks" may also be implemented using an element, and one "unit," "module," "member," or "block" may include a plurality of elements.

In addition, when an element is referred to as being "connected to" another element, it may be directly connected to the other element or indirectly connected to the other element via a wireless communication network.

Also, it may be understood that the terms "include" and "have" are intended to indicate the existence of elements disclosed in the present disclosure, and are not intended to preclude the possibility that one or more other elements may exist or may be added.

In the present disclosure, it may be understood that when one element is referred to as being "on" another element, it may be directly on the other element, or intervening elements may also be present.

In addition, the terms "first," "second," etc. are used to distinguish one component from other components and, therefore, the components are not limited by the terms.

An expression used in the singular form may encompass the expression of the plural form, unless it has a clearly different meaning in the context.

The reference numerals used in operations are used for descriptive convenience and are not intended to describe the order of operations and the operations may be performed in different orders unless otherwise stated.

Hereinafter, embodiments of the disclosure will be described with reference to the accompanying drawings.

Figure 1:
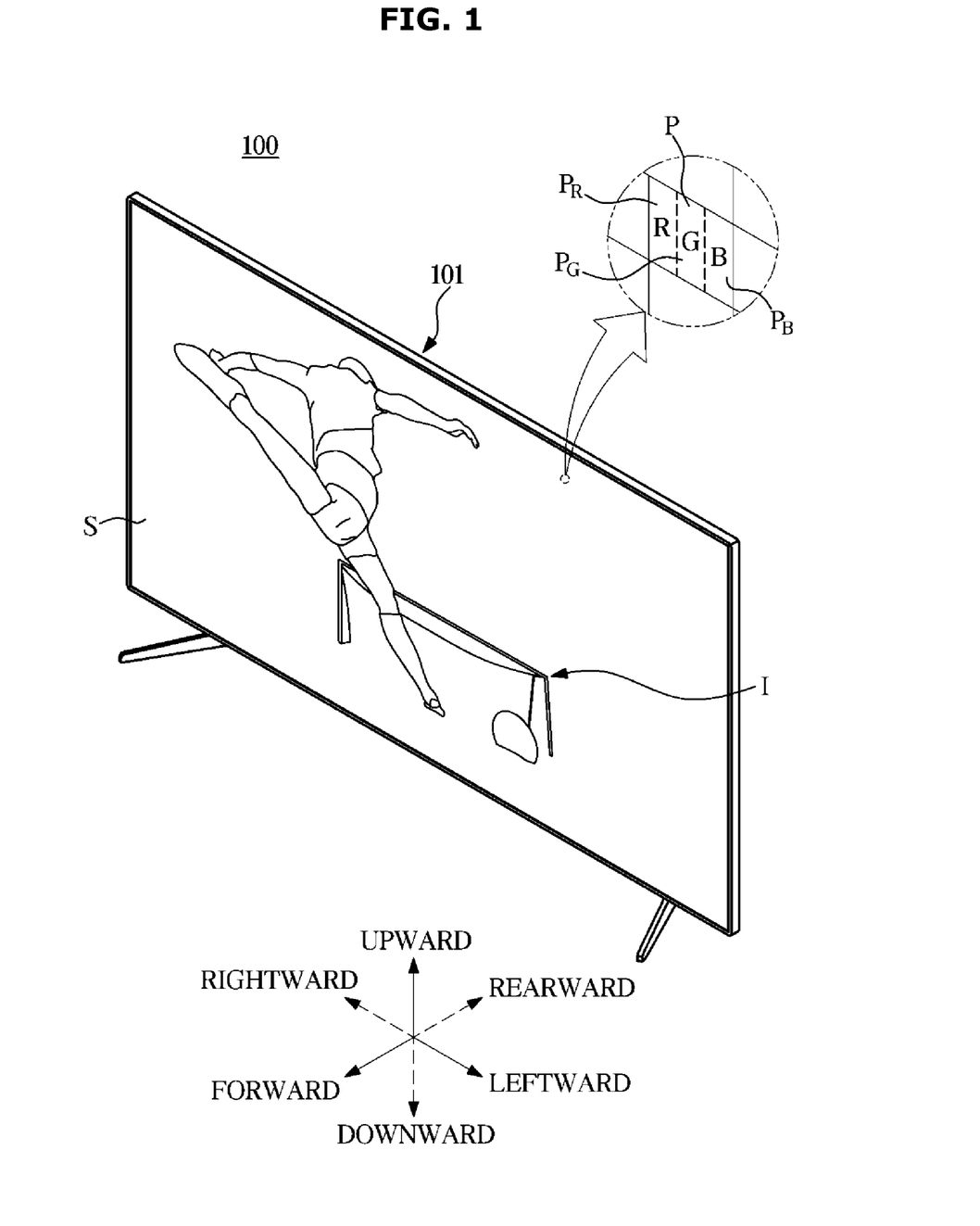
FIG. 1 is a view illustrating an exterior of a display apparatus according to an embodiment.

FIG. 1 is a view illustrating an exterior of a display apparatus according to an embodiment.

A display apparatus 100 is an apparatus capable of processing an image signal received from the outside and visually displaying the processed image signal. Here, the display apparatus 100 may be a television (TV), but the type of the display apparatus 100 is not limited thereto. For example, the display apparatus 100 may be implemented in various forms, such as a monitor, a portable multimedia device, a portable communication device, and a portable computing device. There is no limitation in the shape of the display apparatus 100 as long as the display apparatus 100 is capable of visually displaying an image.

In addition, the display apparatus 100 may be a large format display (LFD) installed outdoors, such as on a building roof or at a bus stop. The term outdoors is not necessarily limited to the outside, but may be understood as a place where many people can access. For example, an indoor areas, such as a subway station, a shopping mall, a movie theater, a company, a store, and etc. may be considered outdoors.

The display apparatus 100 may receive a video signal and an audio signal from various content sources, and may output video and audio signals corresponding to the received video signal and the audio signal. For example, the display apparatus 100 may receive television broadcast content through a broadcast receiving antenna or a cable, receive content from a content reproduction device, or receive the content from a content providing server of a content provider.

As illustrated in FIG. 1, the display apparatus 100 may include a main body 101 configured to accommodate a plurality of components for displaying an image I on a screen S, which is provided on one side of the main body 101.

The main body 101 may form an outer shape of the display apparatus 100 and the component for displaying the image I by the display apparatus 100 may be provided inside of the main body 101. The main body 101 illustrated in FIG. 1 may be in the form of a flat plate, but the shape of the main body 101 is not limited thereto. For example, the main body 101 may be a concave shape in which the left and right ends protrude forward and the center portion is curved away from the front.

The screen S may be formed on the front surface of the main body 101, and the screen S may display the image I. For example, an unmoving image or a moving image may be displayed on the screen S, and a two-dimensional plane image or a three-dimensional stereoscopic image may be displayed.

The screen S may include a plurality of pixels P, and the image I displayed on the screen S may be formed by a combination of light emitted from the plurality of pixels P. For example, a single image I may be formed on the screen S by combining the light emitted by the plurality of pixels P.

Each of the plurality of pixels P may emit the light of various brightness and various colors.

In order to emit light of various brightness, each of the plurality of pixels P may include a configuration capable of emitting the light directly, such as an organic light emitting diode, or a configuration capable of passing or blocking the light emitted by the backlight unit or the like, such as a liquid crystal panel.

In order to emit light of various colors, each of the plurality of pixels P may include subpixels $P_R$, $P_G$, $P_B$.

The subpixels $P_R$, $P_G$, $P_B$ may include the red subpixel $P_R$ capable of emitting red light, the green subpixel $P_G$ capable of emitting green light, and the blue subpixel $P_B$ capable of emitting blue light. For example, the red light may represent a light beam having a wavelength of approximately 620 nm to 750 nm, the green light may represent a light beam having a wavelength of approximately 495 nm to 570 nm, and the blue light may represent a light beam having a wavelength of approximately 450 nm to 495 nm.

By combining the red light of the red subpixel $P_R$, the green light of the green subpixel $P_G$ and the blue light of the blue subpixel $P_B$, each of the plurality of pixels P may emit light of various brightness and various colors.

Although the screen S illustrated in FIG. 1 is in the form of a flat plate, the shape of the screen S is not limited thereto.

The display apparatus 100 may include various types of display panels capable of displaying the image I. For example, the display apparatus 100 may include a liquid crystal display (LCD) panel, a light emitting diode (LED) panel, or an organic light emitting diode (OLED) panel.

Hereinafter, a display apparatus including the LCD panel will be used as an example of the display apparatus 100.

Figure 2:
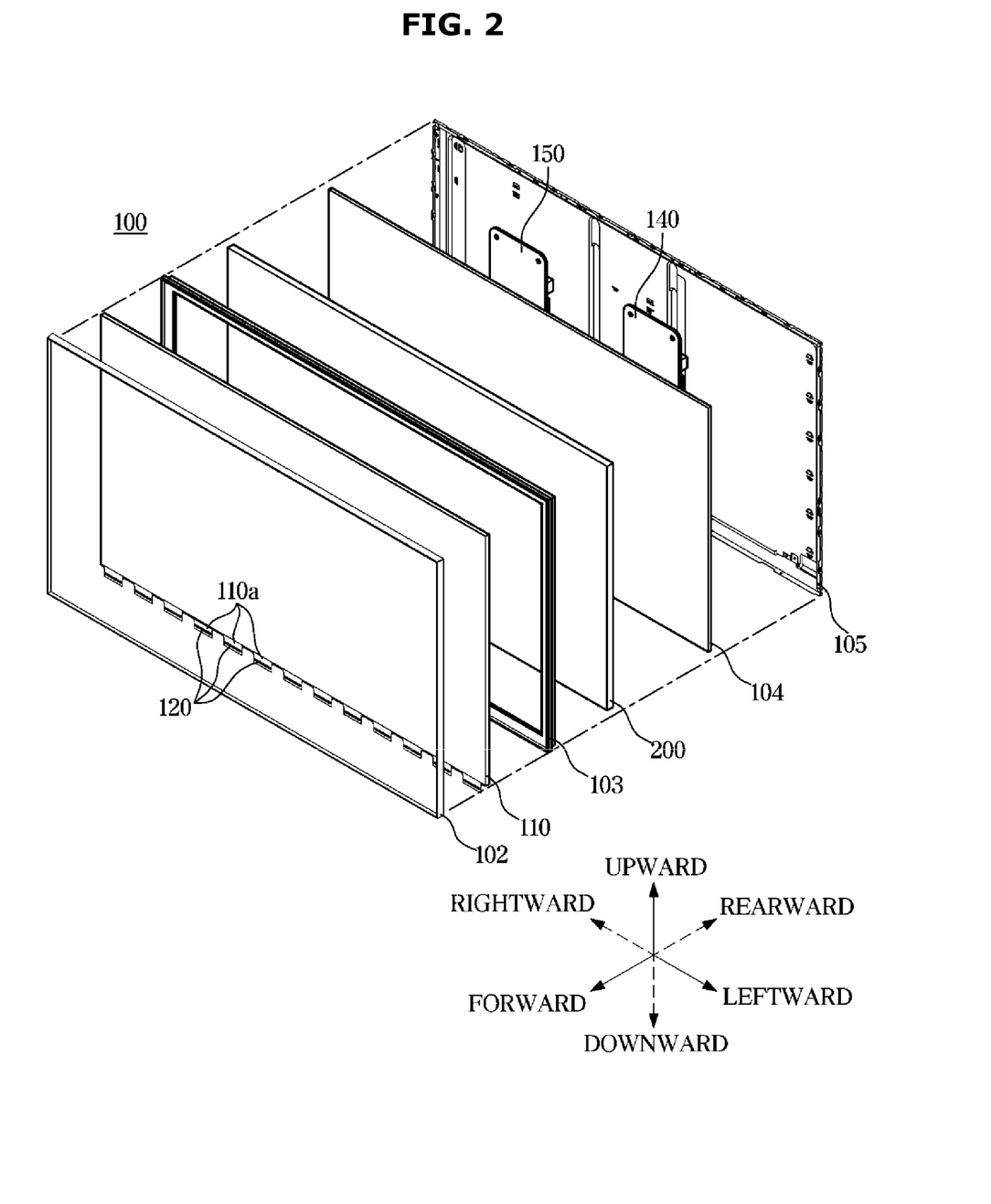
FIG. 2 is an exploded view illustrating the display apparatus according to an embodiment.
Figure 3:
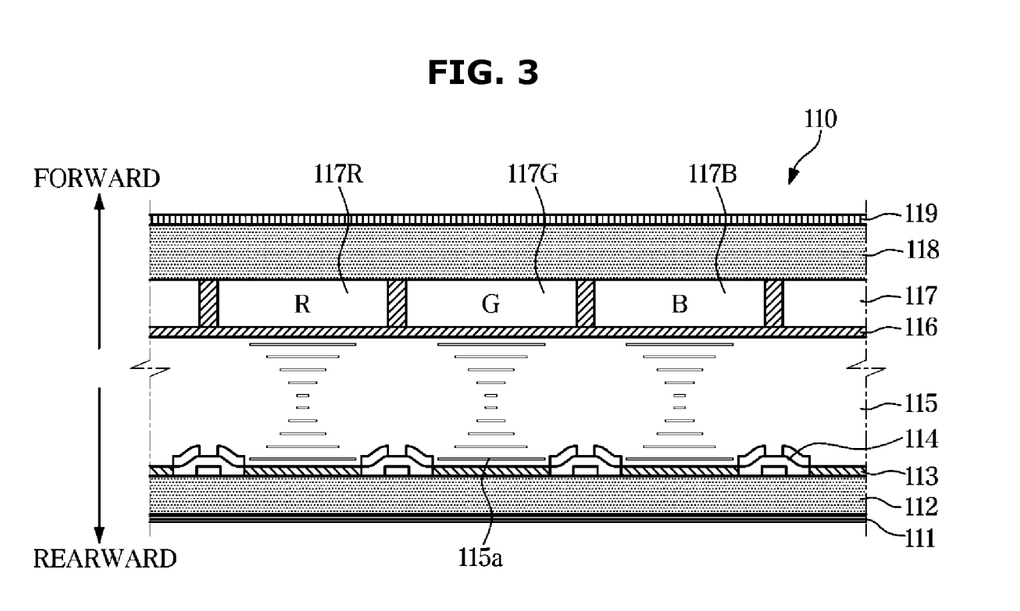
FIG. 3 is a view illustrating an example of a liquid crystal panel which is included in the display apparatus according to an embodiment.

FIG. 2 is an exploded view illustrating the display apparatus according to an embodiment, and FIG. 3 is a view illustrating an example of a liquid crystal panel which is included in the display apparatus according to an embodiment.

As illustrated in FIG. 2, various components for generating the image I on the screen S may be provided in the main body 101.

For example, the main body 101 may include a backlight unit 200 configured to emit a surface light forward, a liquid crystal panel 110 configured to block or pass the light emitted from the backlight unit 200, a control assembly 140 configured to control operations of the backlight unit 200 and the liquid crystal panel 110, and a power supply assembly 150 configured to supply power to the backlight unit 200 and the liquid crystal panel 110. In addition, the main body 101 may further include a bezel 102, a frame middle mold 103, a bottom chassis 104, and a rear cover 105 for supporting and fixing the liquid crystal panel 110, the backlight unit 200, the control assembly 140 and the power supply assembly 150.

The backlight unit 200 may include a point light source for emitting monochromatic light or white light and may refract, reflect, and scatter the light to convert the light emitted from the point light source into a uniform surface light. For example, the backlight unit 200 may include a light source for emitting the monochromatic light or white light, a light guide plate for diffusing the light emitted from the light source, a reflective sheet for reflecting the light emitted from the rear surface of the light guide plate, and an optical sheet for refracting and scattering the light emitted from the front surface of the light guide plate.

As such, the backlight unit 200 may emit a uniform surface light toward the front by refracting, reflecting, and scattering the light emitted from the light source.

The configuration and operation of the backlight unit 200 will be described in more detail below.

The liquid crystal panel 110 may be provided in front of the backlight unit 200 and may be configured to block or pass the light emitted from the backlight unit 200 in order to form the image I.

The front surface of the liquid crystal panel 110 may form the screen S of the display apparatus 100 and may be composed of the plurality of pixels P. The plurality of pixels P included in the liquid crystal panel 110 may independently block or pass the light of the backlight unit 200. The light passed by the plurality of pixels P may form the image I to be displayed on the screen S.

For example, as illustrated in FIG. 3, the liquid crystal panel 110 may include a first polarizing film 111, a first transparent substrate 112, a pixel electrode 113, a thin film transistor 114, a liquid crystal layer 115, a common electrode 116, a color filter 117, a second transparent substrate 118, and a second polarizing film 119.

According to an embodiment, in between the first transparent substrate 112 and the second transparent substrate 118, there may be provided the pixel electrode 113, the thin film transistor 114, the liquid crystal layer 115, the common electrode 116, and the color filter 117 in a fixed manner. The first and second transparent substrates 112 and 118 may be made of tempered glass or transparent resin.

The first polarizing film 111 and the second polarizing film 119 may be provided on the outer sides of the first transparent substrate 112 and the second transparent substrate 118, respectively.

The first polarizing film 111 may be configured to pass certain lights and the second polarizing film 119 may be configured to block other lights.

Specifically, a light may be a pair of fields that oscillate in a direction perpendicular to the traveling direction. The electric field and the magnetic field constituting the light may oscillate in all directions perpendicular to the traveling direction of light, and the oscillation direction of the electric field and the oscillation direction of the magnetic field may be perpendicular to each other.

For example, the first polarizing film 111 may pass the light having the magnetic field oscillating in a first direction and block other lights. In addition, the second polarizing film 119 may pass the light having the magnetic field oscillating in a second direction and block other lights. At this time, the first direction and the second direction may be orthogonal to each other. In other words, the polarizing direction of the light passed by the first polarizing film 111 and the oscillating direction of the light passed by the second polarizing film 119 may be orthogonal to each other. Generally, the light may not pass through the first polarizing film 111 and the second polarizing film 119 at the same time.

According to an embodiment, the color filter 117 may be provided inside of the second transparent substrate 118. Here, the color filter 117 is provided in a rear direction of the second transparent substrate 118.

The color filter 117 may include a red filter 117R for transmitting red light, a green filter 117G for transmitting green light, and a blue filter 117B for transmitting blue light. The red filter 117R, the green filter 117G, and the blue filter 117B may be arranged adjacent to each other.

A region where the color filter 117 is formed may correspond to the pixel P. Specifically, a region where the red filter 117R is formed corresponds to the red subpixel $P_R$, a region where the green filter 117G is formed corresponds to the green subpixel $P_G$, and a region where the blue filter 117B is formed corresponds to the blue subpixel $P_B$.

According to an embodiment, the thin film transistor (TFT) 114 may be provided in a rear direction of the second transparent substrate 118. In addition, the thin film transistor 114 may be disposed on the first transparent substrate 112 provided at a position corresponding to the boundaries between the red filter 117R, the green filter 117G, and the blue filter 117B.

The thin film transistor 114 may pass or block the current flowing to the pixel electrode 113. For example, the electric field may be formed or removed between the pixel electrode 113 and the common electrode 116 by turning on (closing) the thin film transistor 114 or turning off (opening) the thin film transistor 114.

The thin film transistor 114 may be formed of polysilicon or may be formed by a semiconductor process, such as lithography, deposition, or ion implantation.

The pixel electrode 113 may be disposed on the forward direction of the first transparent substrate 112 and the common electrode 116 may be disposed on the rear direction of the second transparent electrode 118.

The pixel electrode 113 and the common electrode 116 may be made of a conductive metal having electrical conductivity and may generate an electric field to change the arrangement of liquid crystal molecules 115a constituting the liquid crystal layer 115.

The pixel electrode 113 may be disposed on the forward direction of the first transparent substrate and may be formed in a parallel region corresponding to the positions of the red filter 117R, the green filter 117G and the blue filter 117B. The common electrode 116 may extend from one side of the liquid crystal panel 110 to the other side in a row direction. In other words, a plurality of the pixel electrodes 113 disposed on the same row may share one common electrode 116. As a result, the electric field may be selectively formed in the liquid crystal layer 115 according to the positions of the plurality of pixel electrodes 113.

The pixel electrode 113 and the common electrode 116 may be made of a transparent material to pass light incident from the outside. For example, the pixel electrode 113 and the common electrode 116 may be made of indium tin oxide (ITO), indium zinc oxide (IZO), silver nano wire, carbon nano tube (CNT), graphene, or PEDOT (3,4-ethylenedioxythiophene).

The liquid crystal layer 115 may be formed between the pixel electrode 113 and the common electrode 116, and the liquid crystal layer 115 may be filled with the liquid crystal molecules 115a.

The liquid crystal may be in an intermediate state between a solid and a liquid. Generally, when a solid material is heated, the state may change from a solid state to a transparent liquid state at a melting temperature. In contrast, when the heat is applied to a liquid crystal material in the solid state, the liquid crystal material may change to the transparent liquid state after being changed into an opaque and turbid liquid at the melting temperature. Most of these liquid crystal materials are organic compounds, and their molecular shapes have a long and narrow rod shape. The arrangement of the molecules is the same as an irregular state in any direction, but may have a regular crystal form in the other direction. As a result, the liquid crystal has both the fluidity of liquid and the optical anisotropy of crystal.

The liquid crystal may also represent optical properties according to the change of the electric field. For example, the direction of the molecular arrangement of the liquid crystal may change according to the change of the electric field.

When the electric field is generated in the liquid crystal layer, the liquid crystal molecules 115a of the liquid crystal layer 115 may be arranged in the direction of the electric field. When no electric field is generated in the liquid crystal layer 115, the liquid crystal molecules 115a may be irregularly arranged or disposed along an orientation layer.

As a result, the optical properties of the liquid crystal layer 115 may change according to the presence or absence of the electric field passing through the liquid crystal layer 115.

For example, when a liquid crystal panel is composed of a Twisted Nematic (TN) type, the liquid crystal molecules 115a may be disposed in a spiral manner, and when the electric field is not formed in the liquid crystal layer 115, the light may pass through the liquid crystal panel 110 due to the arrangement of the liquid crystal molecules 115a of the liquid crystal layer 115. In contrast, when the electric field is formed in the liquid crystal layer 115, the liquid crystal molecules 115a may be arranged vertically with respect to transparent substrates 112 and 118, and the light may not pass through the liquid crystal panel 110.

As another example, when a liquid crystal panel is composed of a Vertical Alignment (VA) type, the liquid crystal molecules 115a may be disposed perpendicular to the transparent substrates 112 and 118. Thus, when the electric field is not formed in the liquid crystal layer 115, the light may not pass through the liquid crystal panel 110 due to the arrangement of the liquid crystal molecules 115a of the liquid crystal layer 115. However, when the electric field is formed in the liquid crystal layer 115, the liquid crystal molecules 115a may be arranged in parallel with the transparent substrates 112 and 118, and the light may pass through the liquid crystal panel 110.

As another example, when a liquid crystal panel is composed of an In-Plane-Switching (IPS) type, the liquid crystal molecules 115a may be disposed horizontally with respect to the transparent substrates 112 and 118. As such, both the pixel electrode 113 and the common electrode 116 may be provided on the first transparent substrate 112, and the electric field in a direction parallel to the transparent substrates 112 and 118 may be formed in the liquid crystal layer 115. Depending on whether the electric field is formed in the liquid crystal layer 115, the light may pass through the liquid crystal panel 110 or may be blocked by the liquid crystal panel 110.

A cable 110a for transmitting image data to the liquid crystal panel 110 and a display driver integrated circuit (DDI) 120 (hereinafter, referred to as "driver IC") for processing digital image data and outputting an analog image signal may be provided on one side of the liquid crystal panel 110.

The cable 110a may electrically connect the control assembly 140, the power supply assembly 150, the driver IC 120, and may also electrically connect the driver IC 120 and the liquid crystal panel 110. The cable 110a may include a flexible flat cable or a film cable which may be bendable.

The driver IC 120 may receive the image data and the power from the control assembly 140 and the power supply assembly 150 through the cable 110a, and transmit the image data and driving current to the liquid crystal panel 110 through the cable 110a.

The cable 110a and the driver IC 120 may be integrally formed of a film cable, for example, a chip on file (COF), a tape carrier package (TCP), or the like. In other words, the driver IC 120 may be disposed on the cable 110a. However, the disclosure is not limited thereto, and the driver IC 120 may be disposed on the liquid crystal panel 110.

The control assembly 140 may include a control circuit for controlling operations of the liquid crystal panel 110 and the backlight unit 200. The control circuit may process the image data received from the external content source, transmit the image data to the liquid crystal panel 110, and transmit dimming data to the backlight unit 200.

The power supply assembly 150 may supply electric power to the liquid crystal panel 110 and the backlight unit 200 so that the backlight unit 200 may output the surface light and the liquid crystal panel 110 may block or pass the light of the backlight unit 200.

Figure 4:
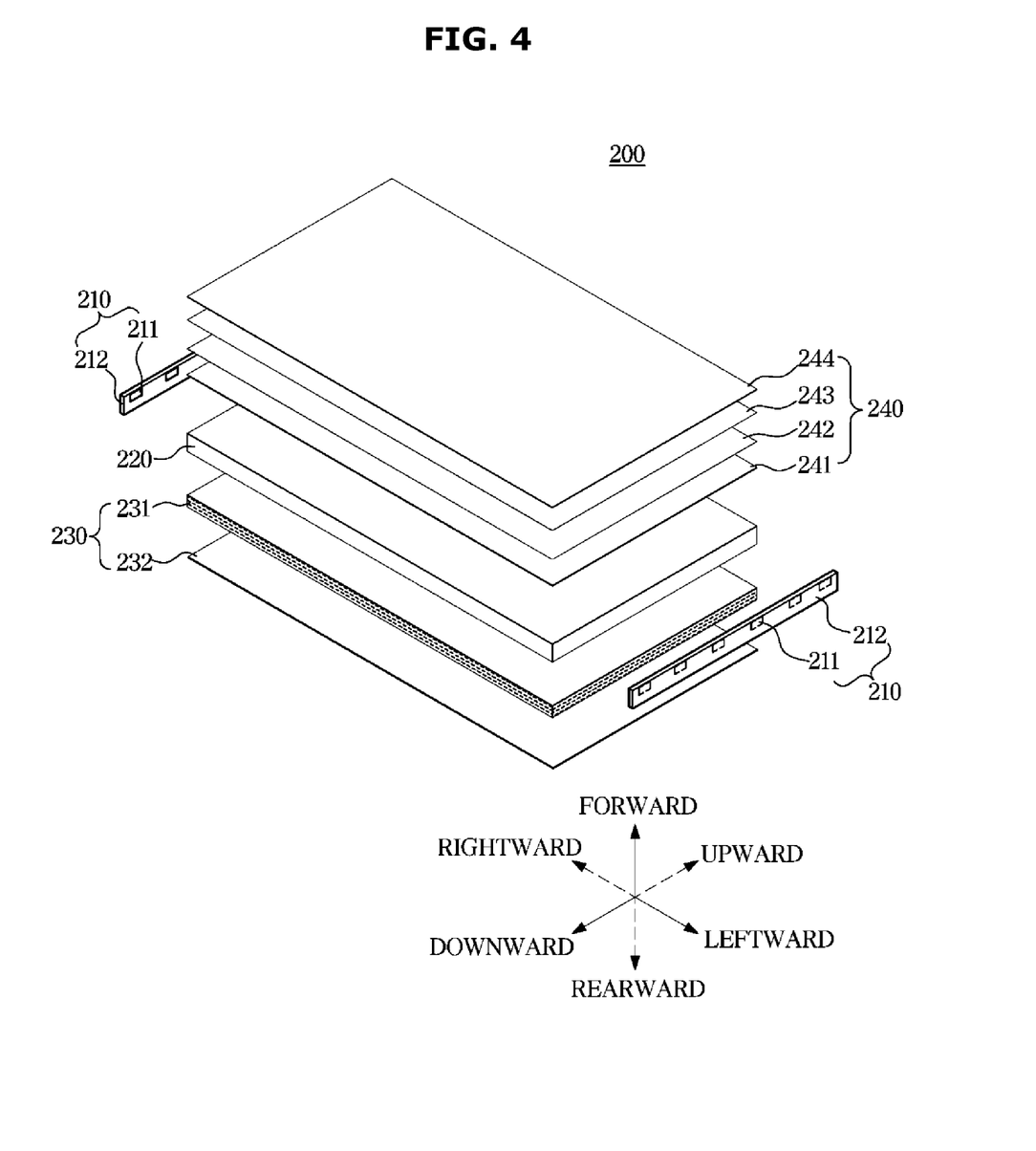
FIG. 4 is an exploded view illustrating a backlight unit according to an embodiment.
Figure 5:
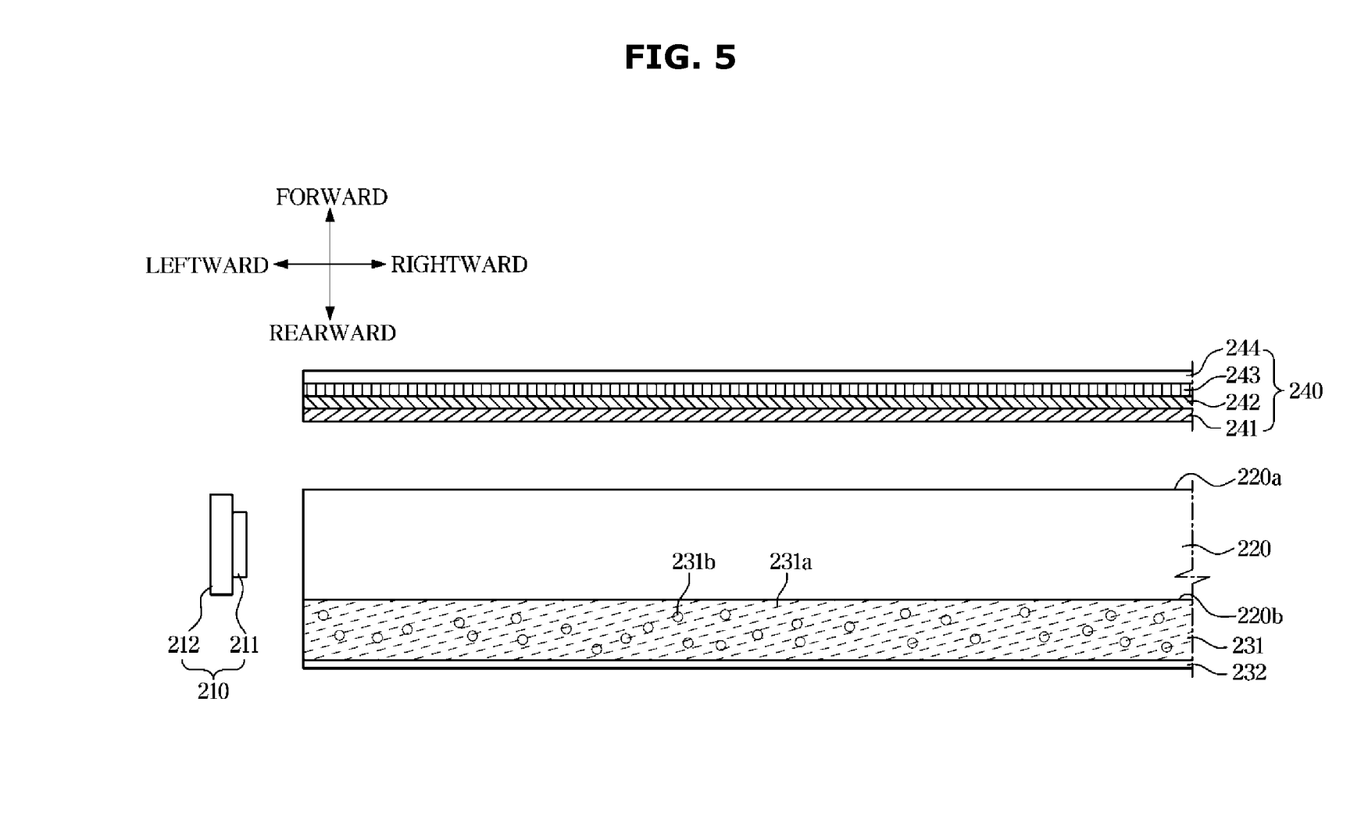
FIG. 5 is a cross-sectional side view of the backlight unit according to an embodiment.

FIG. 4 is an exploded view illustrating a backlight unit according to an embodiment, and FIG. 5 is a cross-sectional side view of the backlight unit according to an embodiment.

As illustrated in FIGS. 4 and 5, the backlight unit 200 may include a light emitting module 210 for emitting light, a light guide plate 220 for diffusing light, a local dimmer 230 for selectively refracting and/or reflecting light, and an optical sheet 240 for improving the luminance of light.

The light emitting module 210 may include a plurality of light sources 211 for emitting light and a supporter 212 for supporting the plurality of light sources 211.

The plurality of light sources 211 may be disposed on a lateral surface of the light guide plate 220 and may emit light toward the center of the light guide plate 220. The plurality of light sources 211 may be arranged at equal intervals so that the light incident on the light guide plate 220 has a uniform brightness. For example, as illustrated in FIG. 4, the plurality of light sources 211 may be disposed at equal intervals on the left and right lateral surfaces of the light guide plate 220, respectively. However, the arrangement of the plurality of light sources 211 is not limited thereto. For example, the plurality of light sources 211 may be disposed on the upper and lower lateral surfaces of the light guide plate 220, or only on one of the left and right lateral surfaces of the light guide plate 220.

Each of the plurality of light sources 211 may emit monochromatic light (light having a specific wavelength, for example, blue light) or white light (light having various wavelengths, for example, a mixed light by mixing red light, green light, and blue light). For example, each of the plurality of light sources 211 may be Light Emitting Diodes (LEDs) or Cold Cathode Fluorescence Lamps (CCFLs) having low heat generation.

The supporter 212 may fix the plurality of light sources 211 so that the positions of the plurality of light sources 211 are steady. Also, power may be supplied to the plurality of light sources 211 through the supporter 212.

The supporter 212 may be disposed on the lateral surface of the light guide plate 220 together with the plurality of light sources 211. For example, as illustrated in FIG. 4, the supporter 212 may be disposed on the left lateral side of the light guide plate 220. However, the arrangement of the supporter 212 is not limited thereto. For example, the supporter may be disposed on the upper and lower lateral surfaces of the light guide plate 220, or on only one of the left and right lateral surfaces of the light guide plate 220.

The supporters 212 may be fabricated with a synthetic resin which fixes the plurality of light sources 211 and on which conductive power supply lines for supplying power to the light sources 211 are formed. Alternatively, the supporters 212 may be fabricated on a Printed Circuit Board (PCB).

The light guide plate 220 may change the traveling direction of light emitted from the plurality of light sources 211 disposed on the lateral surface of the light guide plate 220 and emit light toward the forward direction (hereinafter "front"). In particular, the light emitted from the plurality of light sources 211 may be diffused from the edge portion of the light guide plate 220 to the center portion of the light guide plate 220, so that the light guide plate 220 may emit uniform light toward the front.

A pattern for improving the straightness of light emitted from the plurality of light sources 211 may be formed on a front surface 220a of the light guide plate 220. The pattern formed on the front surface 220a of the light guide plate 220 may be straightened in a direction in which light emitted from the plurality of light sources 211 is emitted. For example, a lenticular lens may be formed in the front surface 220a of the light guide plate 220 in a direction in which light is emitted from the plurality of light sources 211, and the light emitted from the plurality of light sources 211 may be reflected or refracted by the lenticular lens so that it is straightened toward the center portion of the light guide plate 220.

The light incident to the inside of the light guide plate 220 may travel in various directions according to the incident angle. For example, a light incident toward the front of the light guide plate 220 may be totally reflected from the front surface 220a of the light guide plate 220, and then the reflected light may travel toward the center portion of the light guide plate 220. Also, a light incident toward the rear of the light guide plate 220 may be reflected by the local dimming portion 230 provided at the rear of the light guide plate 220, and then the reflected light may travel toward the central portion of the light guide plate 220. The light may also be refracted by the local dimming portion 230 and then may be emitted through the front surface 220a of the light guide plate 220.

Due to the total reflection from the front surface 220a of the light guide plate 220 and the reflection from the local dimming portion 230, the light may travel from the edge portion of the light guide plate 220 to the center portion of the light guide plate 220. The light may travel toward the front of the light guide plate 220 through the front surface 220a of the light guide plate 220 when refracted from the local dimming portion 230.

The light guide plate 220 may be made of poly-methyl methacrylate (PMMA) or polycarbonate (PC).

The optical sheet 240 may include various sheets for improving the luminance of the light emitted through the front surface 220a of the light guide plate 220. For example, the optical sheet 240 may include a diffuser sheet 241, a first prism sheet 242, a second prism sheet 243, and a reflective polarizing sheet 244.

The diffuser sheet 241 may diffuse light in order to improve the uniformity of the luminance of the light emitted through the front surface 220a of the light guide plate 220. For example, the light emitted from the plurality of light sources 211 may be diffused in the light guide plate 220 and then again diffused by the diffuser sheet 241.

When the light is diffused in the diffuser sheet 241, the diffused light may be emitted obliquely from the diffuser sheet 241. In other words, an outgoing angle indicating an angle between the diffused light emitted from the diffuser sheet 241 and the normal line of the diffuser sheet 241 may be greater than an incident angle indicating an angle between the light incident on the diffuser sheet 241 and the normal line of the diffuser sheet 241.

The first prism sheet 242 and second prism sheet 243 may focus the light emitted by the diffuser sheet 241 to increase brightness. That is, the first prism sheet 242 and second prism sheet 243 may refract the diffused light emitted from the diffuser sheet 241 so that the diffused light emitted obliquely from the diffuser sheet 241 travels in forward direction of the backlight unit 200.

The first prism sheet 242 and second prism sheet 243 may include a plurality of prism patterns. For example, each prism may have a trigonal shape, where the plurality of the prism patterns may be arranged adjacent to each other to form a plurality of bands. A direction in which the prism patterns of the first prism sheet 242 are arranged may be orthogonal to a direction in which the prism patterns of the second prism sheet 243 are arranged.

For example, a light passing through the first prism sheet 242 and second prism sheet 243 may have a viewing angle of about 70 degrees. This improves focus of the light, and thus, improves luminance of the light travelling toward the front of the backlight unit 200.

The reflective polarizing sheet 244 may pass a part of incident light, and reflect the other part. For example, the reflective polarizing sheet 244 may pass light polarized in the same direction as a predetermined polarization direction, and reflect light polarized in directions that are different from the predetermined polarization direction.

The polarization direction of the reflective polarizing sheet 244 may be the same as the polarization direction of the first polarizing film 111 included in the liquid crystal panel 110 described above. As a result, the light transmitted through the reflective polarizing sheet 244 may also be transmitted through the first polarizing film 111 included in the liquid crystal panel 110.

Further, the light reflected from the reflective polarizing sheet 244 may be recycled in the backlight unit 200. By recycling the light reflected from the reflective polarizing sheet 244, the luminance of the backlight unit 200 may be improved.

However, the optical sheet 240 is not limited to the sheets or films described herein, and the optical sheet 240 may further include various sheets or films, such as a protection sheet. Furthermore, the order in which the diffuser sheet 241, the first prism sheet 242, the second prism sheet 243, and the reflective polarizing sheet 244 are stacked is not limited to the stack illustrated in FIG. 4. The diffuser sheet 241, the first prism sheet 242, the second prism sheet 243, and the reflective polarizing sheet 244 may be stacked in various orders.

The local dimming portion 230 may include an electro-optic layer 231 in which optical characteristics change according to the electric field and an electrode 232 for forming the electric field in the electro-optic layer 231.

The electro-optic layer 231 may be disposed on a rear surface 220b of the light guide plate 220, and may include an electro-optical material 231a and a plurality of grains 231b. The electro-optical material 231a may demonstrate an electro-optic effect. The electro-optic effect may refer to a phenomenon in which the optical characteristics change according to the electric field. Specifically, the electro-optic effect refers to a phenomenon in which a refractive index, a phase delay, polarization characteristics, and the like of the material, change according to the presence of electric field, the change in intensity of the electric field, and the change in direction of the electric field.

A liquid crystal may be a representative electro-optical material 231a. The refractive index and the polarization characteristics of the liquid crystal may change according to the presence of the electric field and the change in intensity of the electric field. For example, the electro-optical material 231a may use a Polymer Dispersed Liquid Crystal (PDLC), a Polymer Network Liquid Crystal (PNLC), a Cholesteric Liquid Crystal, a Smectic Liquid Crystal, and the like.

As another example, an electro-chromic material may be the electro-optical material 231a. The electro-chromic material may refer to a material in which the color of the material reversibly changes according to the oxidation-reduction reaction by application of a voltage. For example, tungsten oxide ($WO_3$) may be reduced due to electron injection, and the color may change from colorless to blue.

As yet another example, an electro-wetting material may be the electro-optical material 231a. The electro-wetting material may refer to a material that uses electricity to change the surface tension of the liquid. For example, water droplets are agglomerated by the surface tension. When electricity is supplied to the water droplet, the attraction between the water droplet and the bottom surface increases, so that the water droplet spreads on the bottom surface and the refractive index of the water droplet may be changed.

As described above, the electro-optical material 231a of the electro-optic layer 231 may change its optical characteristics based on the presence of the electric field, the change in intensity of the electric field, and the change in direction of the electric field.

Figure 6:
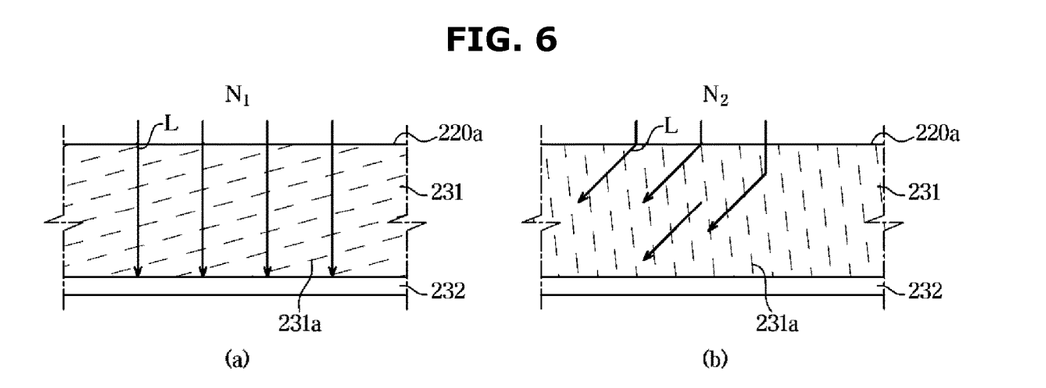
FIG. 6 is a view illustrating an electro-optical material in which optical characteristics change based on the change in direction of an electric field according to an embodiment.

FIG. 6 is a view illustrating an electro-optical material in which optical characteristics change in accordance with the change in direction of an electric field.

According to an embodiment, referring to FIG. 6A, when the electric field is generated in the electro-optic layer 231 in a first direction, the electro-optical material 231a may refract incident light L uniformly at a first refractive index N1. In other words, the light L incident on the electro-optical material 231a may be refracted at the first refractive index N1 irrespective of the position where the light L is incident, and may be refracted in the same direction irrespective of the position where the light L is incident.

On the other hand, referring to FIG. 6B, when the electric field is generated in the electro-optic layer 231 in a second direction, the electro-optical material 231a may refract incident light L uniformly at a second refractive index N2. In other words, the light L incident on the electro-optic layer 231 may be refracted at the second refractive index N2 irrespective of the position where the light L is incident, and may be refracted in the same direction irrespective of the position where the light L is incident.

According to another embodiment, when the electric field of a first intensity is generated in the electro-optic layer 231, the electro-optical material 231*a* may refract the incident light L at the first refractive index N1. When the electric field of a second intensity is generated in the electro-optic layer 231, the electro-optical material 231*a* may refract the incident light L at the second refractive index N2. Here, the electric field of the first intensity is not equal to the electric field of the second intensity.

According to another embodiment, when the electric field is generated in the electro-optic layer 231, the electro-optical material 231*a* may refract the incident light L at the first refractive index N1. When the electric field is not generated in the electro-optic layer 231, the electro-optical material 231*a* may refract the incident light L at the second refractive index N2.

Accordingly, the electro-optical material 231*a* may change the refractive index according to the presence of the electric field, the change in intensity of the electric field, and the change in direction of the electric field.

However, the disclosure is not limited thereto. For example, the electro-optical material 231*a* may change a phase delay, a polarization direction, and the like according to one or more of the presence of the electric field, the change in intensity of the electric field, and the change in direction of the electric field.

In addition, although the electro-optical material 231*a* has been described for only two refractive indices, the electro-optical material 231*a* may have more than two refractive indices.

Referring to FIG. 5, the grain 231*b* of the electro-optic layer 231 may be small particles made of a material having a specific refractive index, or small particles having an inner space and a shell, and may refract the incident light at a constant refractive index.

As described above, the electro-optical material 231*a* of the electro-optic layer 231 may change its optical characteristics according to one of more of the presence of the electric field, the change in intensity of the electric field, and the change in direction of the electric field.

The grain 231*b* may have the same refractive index as any one of a plurality of refractive indices that the electro-optic layer 231 may have according to the presence of the electric field, the change in intensity of the electric field, and the change in direction of the electric field, and may also have the same refractive index as the refractive index of the light guide plate 220.

Although the grain 231*b* is illustrated as having a sphere in FIG. 4, the shape of the grain 231*b* is not limited to the spherical shape, and may have various shapes.

The electro-optical material 231*a* may have the same refractive index or a different refractive index according to the refractive index of the grain 231*b* and the electro-optical material 231*a*.

For example, according to the presence of the electric field, the change in intensity of the electric field, and the change in direction of the electric field, the electro-optical material 231*a* may have the first refractive index N1 or the second refractive index N2 and the grain 231*b* may have the first refractive index N1.

The electrode 232 may be disposed on a surface of the electro-optic layer 231 that is opposite from the light guide plate 220.

The electro-optical material 231*a* and the grain 231*b* may be filled between the electrode 232 and the light guide plate 220 so that the electro-optic layer 231 is formed between the electrode 232 and the light guide plate 220.

The electrode 232 may be not provided between the light guide plate 220 and the electro-optic layer 231, and the electrode 232 may be disposed on the surface of the electro-optic layer 231 that is opposite from the light guide plate 220.

The electrode 232 may control the electric field in the electro-optic layer 231 and may include a common electrode and a signal electrode. The common electrode may be connected to a ground. The common electrode may output a reference potential, for example, '0V', to the signal electrode.

The signal electrode may generate the electric field. When the voltage is applied to the signal electrode, the electric field may be formed between the signal electrode to which the voltage is applied and the common electrode.

The intensity of the electric field formed by the signal electrode and the common electrode may be determined according to the intensity of the voltage applied to the signal electrode, and the direction of the electric field may also be determined according to the intensity change, the frequency, and the phase of the voltage applied at the signal electrode.

The electrode 232 may reflect light with high reflectivity. For example, the light may be incident on the electro-optical material 231*a* of the electro-optic layer 231 from the light guide plate 220 and may pass through the electro-optical material 231*a*. Subsequently, the electrode 232 may reflect the light passed through the electro-optic layer 231 with high reflectivity.

In other words, the electrode 232 may reflect the light emitted through the rear surface 220*b* of the light guide plate 220 to the light guide plate 220.

The electrode 232 may be made of a conductive material capable of passing electricity, and the surface of the electrode 232 may be made of a material having high reflectivity to light.

For example, the electrode 232 may be made of silver (Ag), or may be made of a metal, such as copper or aluminum (Al) coated with silver (Ag). In addition, the electrode 232 may be manufactured by coating a base material having electrical conductivity with a polymer having high reflectivity.

Figure 7:
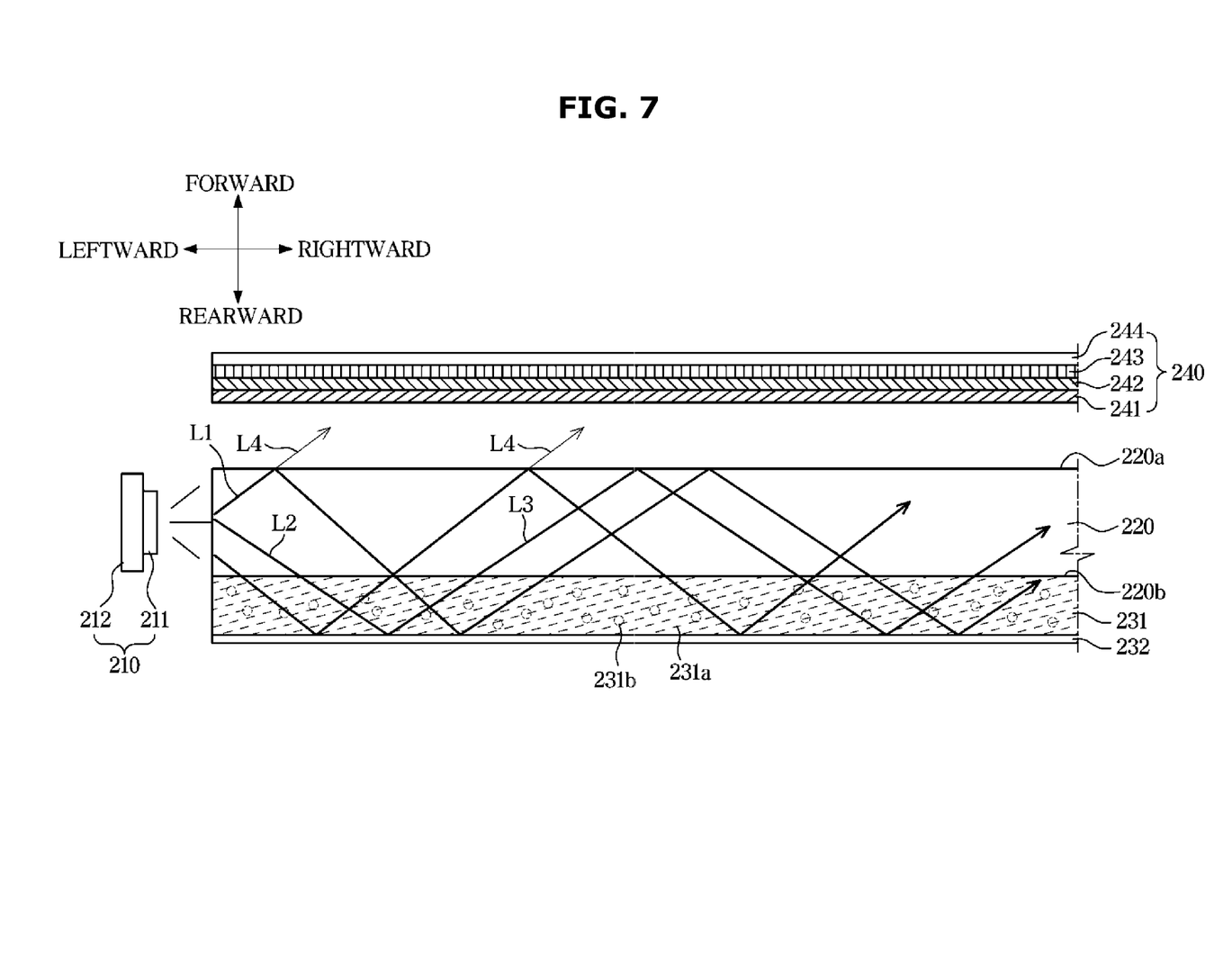
FIGS. 7 and 8 are views illustrating various embodiments of the backlight unit representing the traveling direction of light based on the change in a refractive index of the electro-optical material.
Figure 8:
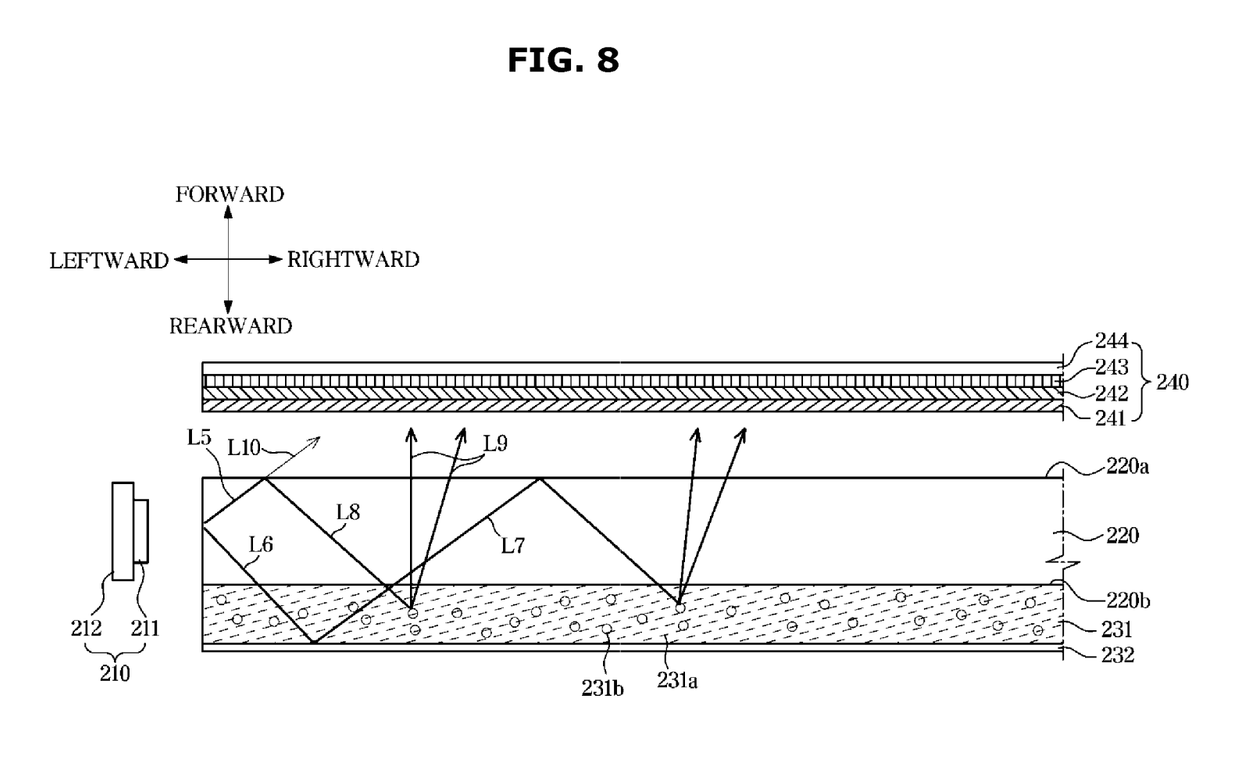

FIGS. 7 and 8 are views illustrating various embodiments of the backlight unit representing the traveling direction of light in accordance with the change in a refractive index of the electro-optical material.

Referring to FIG. 7, when the electro-optical material 231*a* has the first refractive index N1 and the grain 231*b* has the first refractive index N1 due to at least one of the presence, change in intensity, and change in direction of the electric field formed by the electrode 232, the grain 231*b* has the same effect as being transparent to the electro-optical material 231*a*.

Specifically, when the power is supplied to the light source 211, the light source 211 may emit light toward the light guide plate 220. The light emitted from the light source 211 may be incident to the inside of the light guide plate 220. The light incident at the edge portion of the light guide plate 220 may be reflected and travel toward the center portion of the light guide plate 220.

In FIG. 7, a light L1 traveling toward the front surface 220a of the light guide plate 220 may be totally reflected from the front surface 220a of the light guide plate 220. Also, the light L1 traveling from the light guide plate 220 to the air may be totally reflected at the boundary between the light guide plate 220 and the air at an incident angle when the refractive index of the light guide plate 220 is greater than the refractive index of the air.

A light L2 traveling toward the rear surface 220b of the light guide plate 220 may be incident on the electro-optic layer 231 through the rear surface of the light guide plate 220. When the electro-optical material 231a has the first refractive index N1 and the refractive index of the light guide plate 220 also has the first refractive index N1 due to one or more of the presence of electric field, change in intensity of the electric field, and change in direction of the electric field formed by the electrode 232, the light L2 from the light guide plate 220 travelling toward the electro-optic layer 231 may pass through the boundary between the light guide plate 220 and the electro-optic layer 231 without any bend. In other words, the angle at which the light L2 enters or leaves the electro-optic layer 231 does not change due to the same refractive index N1.

As another example, when the grain 231b has the same first refractive index N1 as the electro-optical material 231a, even if the light L2 incident on the electro-optic layer 231 from the light guide plate 220 passes through the grain 231b, the light L2 may propagate inside the electro-optic layer 231 to the electrode 232 without refraction or scattering. Thus, the light L2 reaching the electrode 232 may be reflected by the electrode 232.

A light L3 reflected from the electrode 232 may propagate through the electro-optic layer 231 toward the light guide plate 220. The light L3 reflected from the electrode 232 may pass through the boundary between the electro-optic layer 231 and the light guide plate 220 and enter the light guide plate 220.

Further, the light L3 incident to the light guide plate 220 may propagate toward the center portion of the light guide plate 220. Subsequently, the light L3 propagates toward the front surface 220a of the light guide plate 220 and the light L3 incident to the light guide plate 220 may be totally reflected from the front surface 220a of the light guide plate 220.

As such, the light emitted from the light source 211 may propagate from the edge portion of the backlight unit 200 to the center portion within the light guide plate 220 and the local dimming portion 230 by total reflection and partial reflection.

In addition, a part of a light L4 traveling toward the front surface 220a of the light guide plate 220 may be emitted to the outside of the light guide plate 220 through the front surface 220a. The amount of the light L4 emitted from the light guide plate 220 may be constant regardless of the emitted position with respect to the front surface 220a of the light guide plate 220. In other words, a uniform light may be emitted from the light guide plate 220.

In contrast, referring to FIG. 8, when the electro-optical material 231a has the second refractive index N2 the grains 231b have different refractive indices from N2, the grains 231b have the same effect as being opaque to the electro-optical material 231a. That is, the electro-optic layer 231 may be partially opaque.

Specifically, the electro-optic layer 231 may be opaque at the portions where the grains 231b are formed, and the electro-optic layer 231 may be transparent at the portions where the grains 231b are not present. Also, the light may pass through the transparent portion of the electro-optic layer 231, whereas, the light may not pass through the opaque portion of the electro-optic layer 231, and the light may be scattered in the opaque portion of the electro-optic layer 231.

For example, a light L5 traveling toward the front surface 220a of the light guide plate 220 may be totally reflected from the front surface 220a of the light guide plate 220.

Lights L6 and L8 traveling toward the rear surface 220b of the light guide plate 220 may be incident on the electro-optic layer 231 through the rear surface of the light guide plate 220. The lights L6 and L8 incident on the electro-optic layer 231 may be propagated or scattered to the electrode 232 depending on whether the electro-optic layer 231 is transparent or opaque.

For example, the light L6 incident on the transparent portion of the electro-optic layer 231 may pass through the electro-optic layer 231 and reach the electrode 232. The light L6 may be reflected at the electrode 232 and the light L7 reflected by the electrode 232 may propagate toward the center portion of the light guide plate 220.

In contrast, the light L8 incident on the opaque portion of the electro-optic layer 231 may be scattered in the electro-optic layer 231. Particularly, the light L8 may be refracted in various directions in the electro-optical material 231a at the opaque portion of the electro-optic layer 231. Thus, the electro-optic layer 231 may appear to be opaque due to inconsistent refraction of the incident light in refracted in various directions.

A part of a light L9 may be refracted in a direction similar to the normal direction of the front surface 220a of the light guide plate 220. In other words, an incident angle between the part of the light L9 scattered in the electro-optic layer 231 and the normal line of the front surface 220a of the light guide plate 220 may be less than a critical angle for total reflection in the light guide plate 220. As another example, the other part of the light L9 may be refracted in a direction away from the normal direction of the front surface 220a of the light guide plate 220. As such, the light L9 scattered in the electro-optic layer 231 may be emitted at different angles from the front surface 220a of the light guide plate 220.

Also, similar to the light L2 in FIG. 7, a part of a light L10 traveling toward the front surface 220a of the light guide plate 220 may be emitted to the outside from the front surface 220a of the light guide plate 220.

Figure 9:
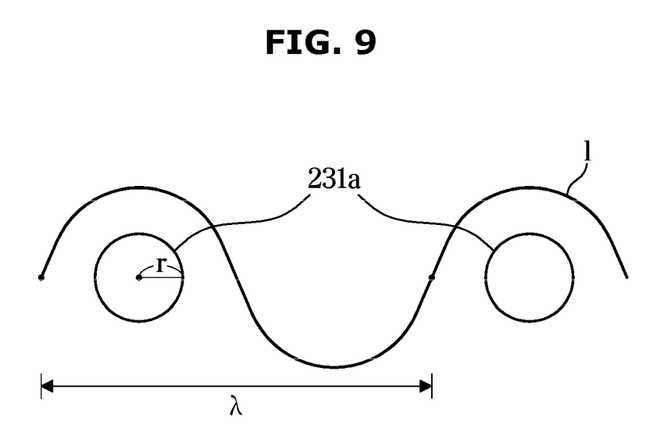
FIG. 9 is a view illustrating a configuration of the electro-optical material of an electro-optic layer included in the backlight unit according to an embodiment.

FIG. 9 is a view illustrating a configuration of the electro-optical material of an electro-optic layer included in the backlight unit according to an embodiment.

As described above, the electro-optic layer 231 may be provided between the light guide plate 220 and the electrode 232, and the electro-optical material 231a may include a Polymer Dispersed Liquid Crystal (PDLC) in which optical characteristics may change depending on the electric field generated by the electrodes.

However, the PDLC may have a particle size smaller than a wavelength ($\lambda$) of light. That is, the PDLC may be a nano-PDLC in which the particle has a radius (r) smaller than ¼ of the wavelength ($\lambda$) of light. Accordingly, the nano-PLDC may pass visible light and may be transparent.

The PDLC may be formed by manufacturing immiscible mixtures (emulsions) of liquid crystals and polymers. The mixtures may have both the structural advantages of the polymer and the electro-optical properties of the liquid crystal.

The liquid state liquid crystal and the liquid state polymer may be mixed to form an emulsion. In addition, the polymer may be optically curing adhesives, for example, poly-acrylates or poly-thiolenes, which may be cured by ultraviolet rays. As the polymer hardens, phase separation may occur between the liquid crystal and the immiscible polymer. Specifically, the polymer may be cured in a mixture of liquid crystal and polymer such that the droplets of the liquid crystal are separated from the polymer structure. Based on the foregoing, the PDLC may be manufactured.

When the concentration of the polymer in the mixture is 30% to 50%, microscale liquid crystal droplets may be manufactured. The liquid crystal molecules of the liquid crystal droplets may be locally aligned, but each liquid crystal droplet may be randomly aligned. Due to the size of the liquid crystal droplets and the isotropic property of liquid crystal droplets, the PDLC may scatter light and have a milky color.

The liquid crystal droplets may be electro-optically relocated according to the presence of the electric field, the change in intensity of the electric field, and the change in direction of the electric field applied to the PDLC, and the refractive index of the PDLC may be changed.

According to an aspect of an embodiment, there is provided a display apparatus capable of performing local dimming to improve a contrast ratio of the image.

According to another aspect of an embodiment, there is provided a display apparatus capable of performing the local dimming using an optical material in which optical properties may be converted in accordance with an electrical signal.

According to another aspect of an embodiment, there is provided a display apparatus capable of minimizing optical loss or luminance loss due to the local dimming.

It would be appreciated by those skilled in the art that various changes may be made herein without departing from the principles and spirit of the inventive concept, the scope of which is defined in the claims and their equivalents.

What is claimed is:

1. A display apparatus comprising:
a light source configured to emit light;
a light guide plate configured to diffuse and emit light emitted from the light source; and
a local dimming portion configured to pass or scatter light emitted from the light guide plate,
wherein the local dimming portion comprises an electro-optical material having refractive index that changes based on an electric field and a plurality of grains having a first refractive index corresponding to refractive index of the light guide plate,
wherein the electro-optical material has either the first refractive index corresponding to the refractive index of the light guide plate or a second refractive index different from the refractive index of the light guide plate, based on the electric field, and
wherein the electro-optical material is a polymer dispersed liquid crystal (PDLC).

2. The display apparatus according to claim 1, wherein the local dimming portion comprises:
an electro-optic layer, optical characteristics of the electro-optic layer changing based on the electric field; and
an electrode configured to generate the electric field in the electro-optic layer.

3. The display apparatus according to claim 2, wherein the electrode is configured to reflect light that has passed through the electro-optic layer.

4. The display apparatus according to claim 1, wherein the light guide plate is configured to:
have a first surface and a second surface; and
diffuse light emitted from the light source and emit the light through the first surface, and
wherein the local dimming portion is configured to pass or scatter light emitted through the second surface of the light guide plate.

5. The display apparatus according to claim 4, wherein the light scattered by the local dimming portion is configured to be emitted through the first surface of the light guide plate.

6. The display apparatus according to claim 1, wherein the electro-optical material is configured to change the refractive index based on at least one of a presence of the electric field, an intensity of the electric field, a direction of the electric field.

7. The display apparatus according to claim 1, wherein the electro-optical material is configured to have two different refractive indices based on at least one of a presence of the electric field, an intensity of the electric field, or a direction of the electric field.

8. The display apparatus according to claim 1, wherein a plurality of particles of the electro-optical material are configured to have a size smaller than a wavelength of light.

9. The display apparatus according to claim 1, wherein a plurality of particles of the electro-optical material are configured to have a radius smaller than ¼ of a wavelength of light.

10. A display apparatus comprising:
a light guide plate; and
a local dimming portion provided on one surface of the light guide plate, and configured to pass or scatter light emitted from the light guide plate through the one surface,
wherein the local dimming portion comprises an electro-optical material having refractive index that changes based on an electric field and a plurality of grains having a first refractive index corresponding to refractive index of the light guide plate,
wherein the electro-optical material has either the first refractive index corresponding to the refractive index of the light guide plate or a second refractive index different from the refractive index of the light guide plate, based on the electric field, and
wherein the electro-optical material is a polymer dispersed liquid crystal (PDLC).

11. The display apparatus according to claim 10, wherein the local dimming portion comprises:
an electro-optic layer, optical characteristics of the electro-optic layer changing based on the electric field; and
an electrode configured to generate the electric field in the electro-optic layer.

12. The display apparatus according to claim 11, wherein the electrode is configured to reflect light that has passed through the electro-optic layer.

13. The display apparatus according to claim 10, wherein the electro-optical material is configured to change the refractive index based on at least one of a presence of the electric field, an intensity of the electric field, or a direction of the electric field.

14. The display apparatus according to claim 10, wherein the electro-optical material is configured to have two different refractive indices based on at least one of a presence of the electric field, an intensity of the electric field, or a direction of the electric field.

15. The display apparatus according to claim 10, wherein a plurality of particles of the electro-optical material are configured to have a size smaller than a wavelength of light.

* * * * *